No. 625,534. Patented May 23, 1899.
W. P. BETTENDORF.
UNDERFRAME FOR CARS.
(Application filed Aug. 12, 1898.)
(No Model.) 3 Sheets—Sheet 2.
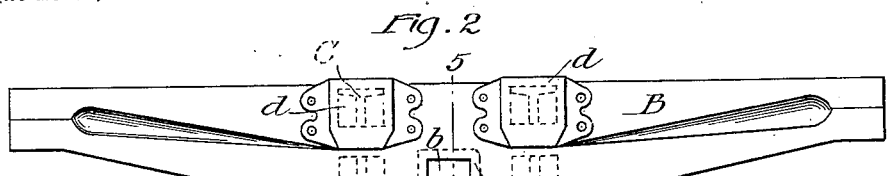
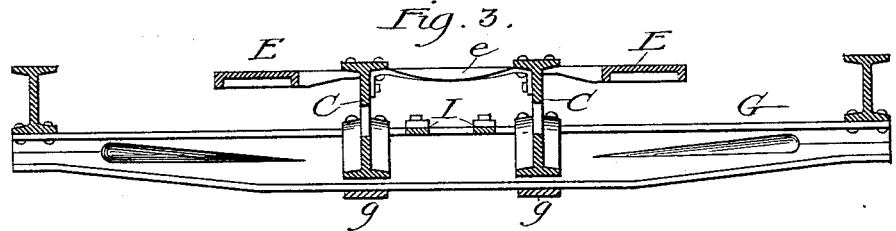
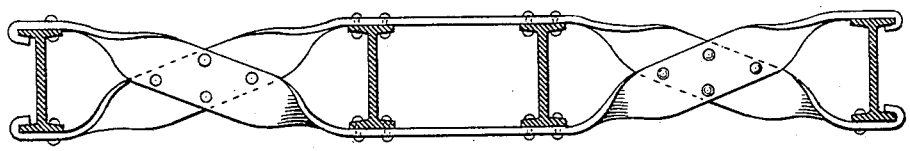
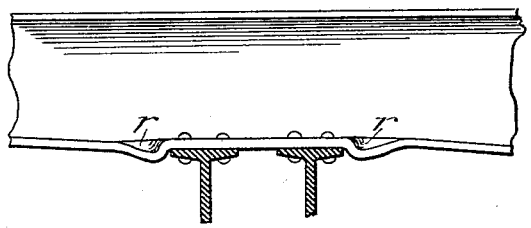
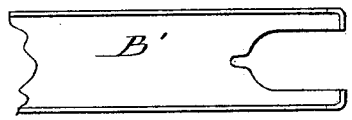
Witnesses:
Frank S. Blanchard
Marcia Friel
Inventor:
William P. Bettendorf
By Attorney
Frank D. Thomason No. 625,534. Patented May 23, 1899.
W. P. BETTENDORF.
UNDERFRAME FOR CARS.
(Application filed Aug. 12, 1898.)
(No Model.) 3 Sheets—Sheet 3.
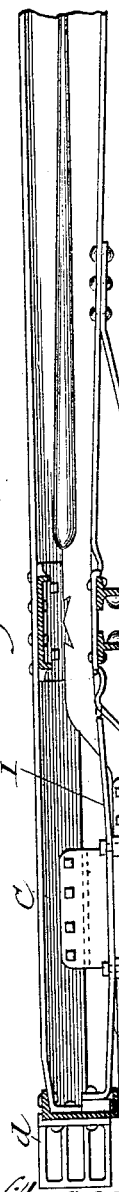
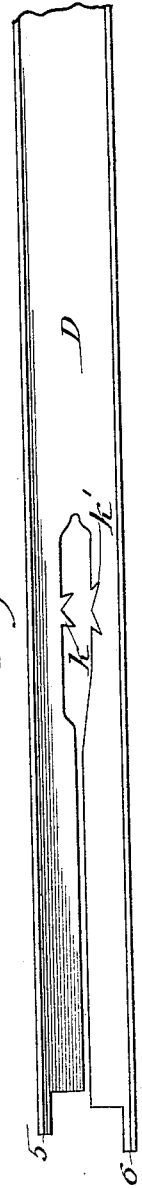
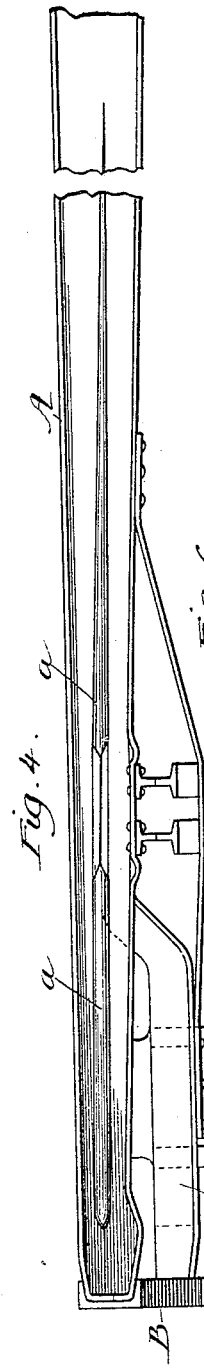
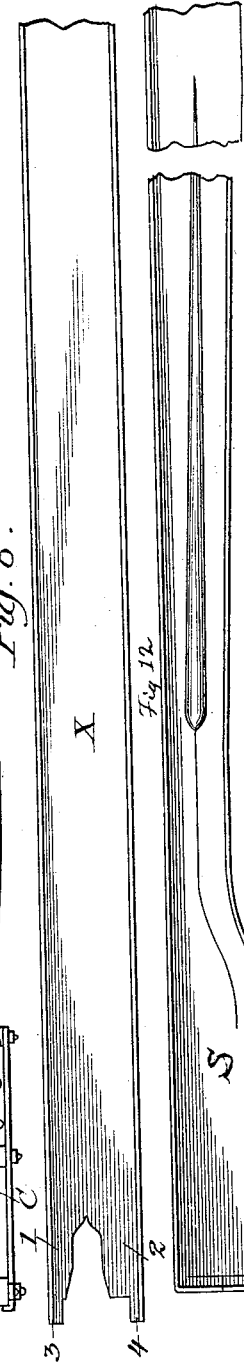
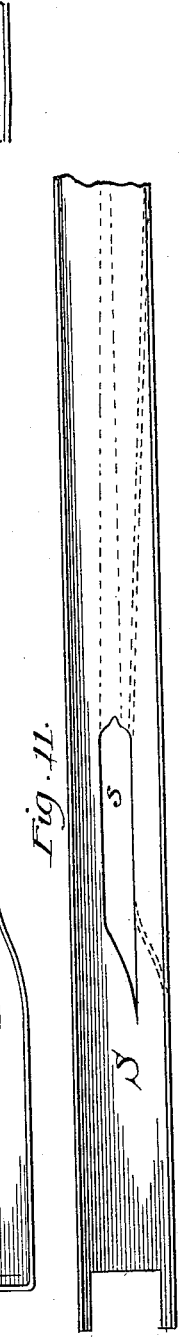
Witnesses:
Frank S. Blanchard
Marcia Friel
Inventor:
William P. Bettendorf
By Attorney
Frank D. Thomason

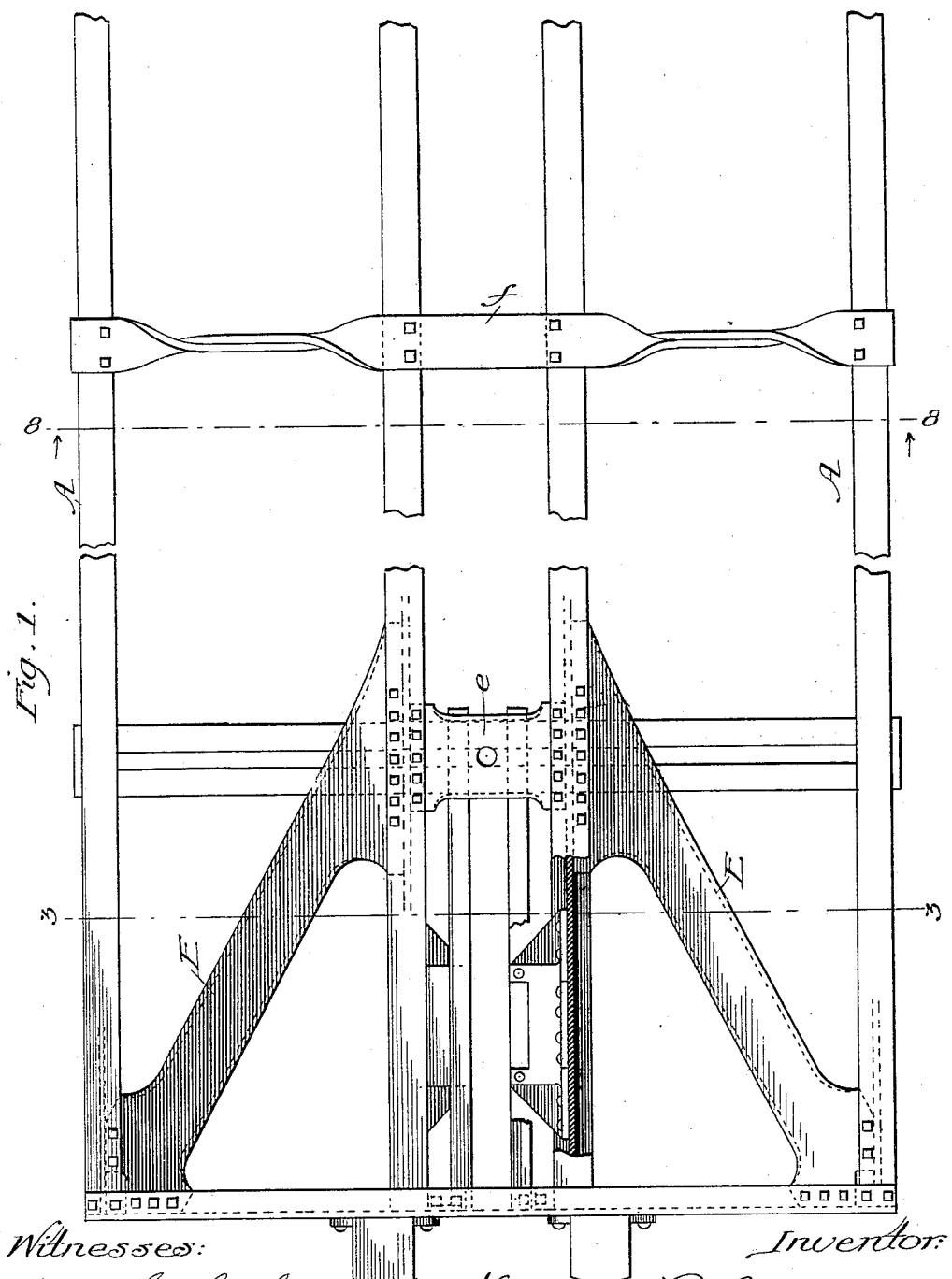

UNITED STATES PATENT OFFICE.

WILLIAM P. BETTENDORF, OF DAVENPORT, IOWA.

UNDERFRAME FOR CARS.

SPECIFICATION forming part of Letters Patent No. 625,534, dated May 23, 1899.

Application filed August 12, 1898. Serial No. 688,440. (No model.)

*To all whom it may concern:*

Be it known that I, WILLIAM P. BETTENDORF, a citizen of the United States, and a resident of Davenport, in the county of Scott and State of Iowa, have invented certain new and useful Improvements in Underframes for Cars, of which the following is a full, clear, and exact description, reference being had to the accompanying drawings and to the letters and figures of reference marked thereon.

My invention has for its object the construction of an all-steel underframe for railway-cars which will be light, durable, and strong. This I accomplish by the means hereinafter fully described and as particularly pointed out in the claims.

In the drawings, Figure 1 is a plan view of one-half of the underframe for cars embodying my invention. Fig. 2 is an end view of the same. Fig. 3 is a transverse vertical section taken on dotted line 3 3, Fig. 1. Fig. 4 is a side view thereof. Fig. 5 is a longitudinal section taken on dotted line 5 5, Fig. 1. Fig. 6 shows a side view of an I-beam blank from which the side sills of the underframe are made. Fig. 7 shows a side view of an I-beam blank from which the center sills of said frame are made. Fig. 8 is a transverse section of my invention, taken on dotted line 8 8, Fig. 1. Fig. 9 is a side view of the portion of the sills resting on the beams of the bolster and the upper portion of the bolster broken away from the remainder of the frame. Fig. 10 shows a side view of the channel-beam blank from which the end sills are made. Fig. 11 shows a modified form of a blank from which the center sill can be made. Fig. 12 is a view thereof when completed.

The principal parts of my invention are the side sills, the center sills, the end sills, and the parts such as the diagonal end braces and the more centrally-located side-sill braces for strengthening the underframe in a transverse direction. Of course there are numerous attachments and other parts which are united with the sills and braces which are necessary to complete the said underframe and constitute part of the invention; but they are subordinate to the main features stated.

The side sills A of the said underframe are composed of I-beams of a length corresponding to that of the car in the construction of which it is used, having its end portions reduced, so as to adapt it to the construction of the remaining parts of the underframe. I accomplish this reduction of the side sills A by first taking a blank X, consisting of a suitable section of, say, twelve-inch I-beam, and removing from the web thereof, at each end, a gore-shaped piece, so that each end of the blank will have two legs 1 and 2, having extremities 3 and 4, which consist of short corresponding extensions of the flanges with a fin of web integrant therewith. In reducing the blank thus constructed the web is provided with a longitudinal corrugation $a$, extending in alinement from the inner end or crotch of the gore-shaped incision at its end. The length of this corrugation and the depth thereof from the deepest point of the same, contiguous to the crotch of the incision, to the shallowest or disappearing point thereof, nearest the center of length of the sill, are such that the end portions of said side sills gradually taper by the inclination of the lower flange thereof upward from said disappearing point of the corrugation to a point contiguous to the crotch of the cut-away portion of the web at the ends of the same. The making of this corrugation brings the edges of the recessed portions of the ends of said sills together and causes the lower flange, coming in the same vertical plane as the said recessed portion, to curve downward a short distance, whereupon both the upper and lower flange incline or converge as they approach the end. This convergence of the flanges at the ends of the sills is caused, first, by beveling the edges at the mouth or entrance of the gore-shaped incision at the ends of the blank and then, after the corrugations take place, pressing these beveled edges flat together and bending the extremities 3 and 4 toward each other at right angles to their original positions, so as to bring the flanges of the same in vertical alinement and so that said flanges will bound the very ends of the sills.

The flange-bound ends of the side sills are of such height that they fit flat against the web and snugly between the flanges of the reduced ends of the channeled-beam end sill B of the underframe. This end sill B is of a truss shape and has its upper flange straight throughout its entire length; but its lower flange at each end, commencing at a point contiguous to where the draw-bar passes through, is inclined upward toward its ends. This inclination of the lower portion of the web and lower flange of the end sills is accomplished by cutting from the web thereof, at each end, a longitudinally-elongated piece of metal of such shape that the edges thereof in the blank B' are parallel the greater part of the length of said incision and then converge toward each other to the crotch, substantially as shown.

By corrugating the web of the blank B' longitudinally in alinement with the incisions in the ends thereof the lower flange is drawn upward to give the end sills the truss shape shown in the drawings. The corrugation employed for this purpose is deepest at the point about where the crotch of the cut-away portion of the ends is located, and then gradually decreases in depth as it approaches the disappearing point thereof, coming in the same vertical plane as the point where the inclination of the lower flange of said end sill commences.

When the ends of the end sills B are thus reduced, the flange-bounded ends of the side sills are fastened thereto by rivets passing through the web of said end sills and end flanges bounding the side sills. At the center of length of the lower flange of the end sills I cut out a rectangular piece of such proportions as to include said lower flange and a portion of the web and so as to form an opening $b$ to permit of the passage therethrough of the draw-bar of the car-coupler. The lower edge or flange of the center of length of the end sill is reinforced, and the lower side of opening $b$ is formed by a draw-bar carry-iron $c$, which consists of a flat bar of suitable dimensions, that is secured to the said end sill by bolts or rivets passing therethrough and through the lower flange of said end sills. The vertical sides and top of said opening $b$ are reinforced by a chapping-iron $c'$, consisting of a flat bar of metal having its central portion given a yoke shape, so as to arch over the draw-bar, and its ends on either side of said yoke arranged in alinement and secured to the flange of the end sill, preferably by the same bolts or rivets with which the carry-iron is secured thereto.

Secured to the inner surface of the web of the end sills, at points located at an equal distance from the center of length of the said end sills and just beyond the extremities of the chapping-iron $c'$, are the center sills C C of the underframe. These center sills consist of corresponding parallel I-beams, that are of a length corresponding to the length of the car. At the point where the body-bolsters are secured to the underframe their height or vertical dimensions are reduced to the minimum, and from this point of their minimum height to the end sills their end portions are bifurcated, and such bifurcated ends are separated, or they are otherwise constructed so as to obtain their maximum height. I prefer to accomplish this result by bifurcating the ends of the I-beam blank D, from which the center sills are made, by means of an incision which is very narrow from its mouth or entrance to a point corresponding to about three-fifths of its length, whereupon its width is increased to such an extent as to remove about one-third of the height of the web of the blank at this point. The edges of such wider portion of the incision continue parallel to near the inner terminus of the incision, where they approach each other in corresponding converging planes to the crotch thereof. In forming the center sills from the blank thus constructed I corrugate the blank longitudinally from and in alinement with the confluence of said bifurcations to a suitable point nearer the center of the sill. This brings the meeting edges of the inner widest part of the incision in contact, whereupon they may, if desired, be secured together by means of a swallow-tail tenon $k$ on one of said edges and a corresponding recess $k'$ in the other opposing edge. The proportions of this tenon and its counterpart recess are such that when the said edges are brought together by the process of corrugation the spurs of said tenon enter and spread apart to fill and interlock with the undercut ends of the said recess. This corrugation is in the center sills, like the corrugations in the end sills and side sills, deepest at the end of the incision and gradually becomes shallower and disappears entirely at a point nearer the center of length of the said sill. Such corrugation causes the lower flange of the said sill to incline upward from a point in the same vertical plane as the disappearing point of the corrugation to the confluence of the bifurcations, at which point the minimum height of the said center sill is reached. From the point where the bifurcations of the center sill are interlocked by the tenon and recess aforesaid the lower bifurcation is curved downward until said lower bifurcation becomes separated from the upper bifurcation and their adjacent edges are a suitable distance apart, whereupon said bifurcations continue in parallel planes to their ends. The upper bifurcation is slightly shorter than the lower bifurcation, and I prefer to extend the flanges, together with a narrow fin or web integrant therewith, beyond the end of each of these bifurcations, so as to provide corresponding extremities 5 and 6, substantially as shown. These extremities 5 and 6 are bent at right angles to their original position in the blank, so as to provide the end of each bifurcation with a flange by means of which the ends of said bifurcations may be secured to the web of the end sills by rivets, substantially as shown, contiguous to the upper and lower flange of the latter.

I secure to the outer surface of the end sills, directly opposite the ends of the upper bifurcations of the center sills, the buffer-blocks $d\ d$, which may be of any suitable design.

The center sills are connected at a point immediately above the body-bolster by a cross-plate e, of suitable design, which has a central opening therein for a king-bolt, and I reinforce said center sills by diagonal braces E E, which are preferably formed from a sheet-metal blank and are so shaped that their obliquely-cut rear end is fastened under the flange of the side of the center sill facing the side sill, at a point about opposite the cross-plate e, and has its spear-shaped opposite end secured under the flanges of the ends of the side sill and end sill contiguous to the inner angle of the corners of the underframe.

At or near the center of length of the underframe I connect the center sills and side sills by a reinforcing cross-frame, which consists of two corresponding transverse straps m and n, preferably made of wrought-steel. One of these straps, m, has its ends riveted or otherwise suitably secured to the under side of the lower flange of the side sills, with its extremities overlapping the outer edge of the same, and from thence it extends obliquely upward to and over the upper flanges of the center sills, to which it is riveted, as shown. The other strap, n, is arranged just the reverse of its companion strap m—that is to say, its ends are similarly secured to the top of the upper edges of the side sills, and from thence it extends down under the center sills, to the lower flange of which it is suitably riveted. At the point where these straps m and n pass each other—to wit, between the side and center sills—I prefer to twist them, so that their broad surfaces will oppose and may be brought flat together and riveted, as shown. A cross-frame thus constructed distributes the load from the center sills to the side sills, and vice versa. If desired, the stretch of these straps coming between the side sills may be omitted. I prefer to construct them as shown, however.

The body-bolster G used in connection with my improvements consists of a couple of parallel I-beams, that pass under the side and center sills and support the same at the point where said sills are of least height. These I-beams of the bolster are tied to the center sills by wrought-steel straps g, the rear ends of which are secured to the lower flange of said center sills at points a suitable distance removed from said bolster nearer the center of length of the car. They extend under the bolster and then forward until they come in contact with the lower bifurcation of the ends of the center sill, where they are suitably secured to the flange of the same about midway between the bolster and the end of the car. About in the same transverse plane as the point where the ends of the straps g g are secured to the lower bifurcations of the center sills I secure the draw-bar stop-blocks H H to said bifurcations by rivets or otherwise. These blocks have their opposing surfaces suitably depressed for the reception of contiguous parts of the draft-rigging and are each provided with an upwardly-projecting flange, which is riveted to the web of the upper bifurcations, and side flanges, which are riveted to the lower bifurcation, thus assuring their rigidity in proper position and at the same time assisting in maintaining the relative positions of said upper and lower bifurcations of each sill.

I represents the draw-bar guides, which consist of flat bars of suitable metal having their rear ends flanged downward, so as to lap over the rear edge of the body-bolster between and next the center sills and extend longitudinally to the end sill, to which their upper turned ends are suitably riveted. These guides I dip downward slightly and come in contact with blocks and are secured thereto by bolts 7 7, which latter extend vertically through knuckles made in the outwardly-projected portion of said blocks forming the shoulders bounding the depressed surface thereof. The lower ends of these bolts extend through the rear portion of the guide-straps h h, which extend longitudinally forward, and have their forward ends secured to the lower flange of the end sill.

In order to prevent the shearing of the rivets securing the side and center sills to the bolsters or elsewhere wherever such a construction is desirable, I dip or sag the flange of the beam or sill downward, as shown at r in Fig. 9. This construction on either side of the beams of the bolster transfers the longitudinal strain on the longitudinally-arranged members of the underframe from the heads of the rivets to the transversely-arranged members of the same and greatly adds to the durability of the underframe.

In Fig. 11 I show a modified form of blank for the center sills of the underframe. This blank S is made from an I-beam whose original height corresponds to the vertical distance from the lower flange to the upper flange of the bifurcated end portions of the center sills, as hereinbefore described, and is provided with a longitudinally-elongated opening s in the web at about the point where it is arched over the body-bolsters. By corrugating this blank longitudinally and centrally from the broader terminus of the openings toward the center of length of the beam a shape is obtained corresponding to that shown in dotted lines in said Fig. 11.

What I claim as new is—

1. In an underframe for cars, a sill consisting of a single flanged beam having its web so displaced that at the point where it crosses over the body-bolster its mean height is decreased by the upward curvature of the lower flange thereof.

2. In an underframe for cars, a center sill consisting of a flanged beam having its ends bifurcated and its web so displaced at the crotch of said bifurcations that the normal distance between its flanged edges is decreased; said bifurcations between the confluence thereof and the end of the sill being separated so that the normal distance between the flanged edges of that portion of said sill is increased.

3. In an underframe for cars, a center sill consisting of a flanged metal beam having its end portions suitably bifurcated and the bifurcations separated so as to increase the mean distance between its flanges and having its web commencing at about the confluence of said bifurcations corrugated longitudinally toward the center of the sill so as to lessen the mean distance between the flanges, conterminous therewith.

4. In an underframe for cars, a sill consisting of a flanged metal beam having its web displaced so that at the point where it crosses over the body-bolster its normal height is decreased by the upward curvature of the lower flange thereof, and having a short portion of its upper and lower flange, at the ends extended and bent so as to provide flange-bound end edges for the web of said sill.

5. The combination in an underframe for cars with the body-bolsters, and the end sills consisting of flanged beams, of the center sills and the side sills; said center sills and side sills each consisting of a single flanged metal beam having the web thereof near each end displaced so that at the point where it crosses over said bolster its normal height is reduced by the upward curvature of the lower flanges, as and for the purpose set forth.

6. In an underframe for cars, the body-bolster and the end sills consisting of flanged metal beams in combination with the center sills and the side sills; said center sills and side sills consisting of flanged metal beams having their webs displaced at the point where they cross over the bolster to reduce the normal height of the same at that point, and having a short length of flange and a fin of integrant web extended beyond the ends thereof and bent to provide flange-bound end edges for said sills that are suitably secured to the end sills, as and for the purpose set forth.

7. In an underframe for cars, the body-bolsters, and the end sills consisting of flanged metal beams, in combination with the center sills, and the side sills: said center sills and side sills consisting of single flanged beams having their webs displaced at the point where they cross over said bolsters to reduce the normal height of the same at that point, and having a short length of flange extend beyond the ends thereof and bent to provide flange-bound end edges for the web of said sills that are suitably secured to the end sills, as and for the purpose set forth.

8. In an underframe for cars, the body-bolster and the end frames consisting of suitable beams, in combination with the center sills consisting of flanged metal beams having their ends bifurcated and their webs so displaced that the normal height thereof at the confluence of said bifurcations is decreased, and having said bifurcations between said point of reduced height and the ends of said sills separated to increase the normal distance between the flanged edges thereof, and said side sills consisting of flanged metal beams having their webs so displaced at the point where they cross over the body-bolsters that the normal height thereof is decreased by the upward curvature of the lower flanges of the same, as and for the purpose set forth.

9. In an underframe for cars, the combination with body-bolsters consisting of flanged metal beams, and the end sill consisting of flanged metal beam the web of which at each end is so displaced to give the same a truss shape and which is provided with a suitable opening at about the center of length of its lower edge, in combination with the center sills and the side sills; said center sills and side sills consisting of flanged metal beams of a mean height less than that of the said end sills, having the web thereof so displaced that their normal height is decreased at the point where they cross over the body-bolster; said center sills having their ends bifurcated and such bifurcations separated between the body-bolster and the ends thereof so as to increase the mean height thereof to correspond to the distance between the flanges of the central portion of the end sills to which the same are suitably secured, as and for the purpose set forth.

10. In an underframe for cars, the combination with body-bolsters consisting of flanged beams, and the metal end sills, of the side sills suitably secured at their ends to said end sills, and the center sills consisting of flanged metal beams having the web thereof at the point where they cross over said body-bolsters so displaced that their normal height is decreased, and having their ends bifurcated and the lower bifurcations between said bolsters and the end frame bent downward and separated from the upper bifurcation to increase the distance between the flanges of that portion of the sill, draw-bar stop-blocks secured to the said bifurcations, straps having their rear ends secured to said center sills at suitable points nearer the center of length of the car and extended longitudinally under said bolsters, and having their forward ends secured to the lower bifurcation of said center sills, and draw-bar guides having their rear ends secured to the top of said bolster and their forward ends suitably secured to the end sills, as and for the purpose set forth.

11. In an underframe for cars a sill consisting of a single continuous flanged beam having its web displaced so as to vary the height thereof at different points along its length and having flange-bound end edges.

12. In an underframe for cars a longitudinal metal sill having its height increased between where it passes over the body-bolsters and its ends.

13. In an underframe for cars a longitudinal metal sill having the height thereof decreased at the point where it passes over the body-bolster, and increased between the said body-bolster and its end.

14. In an underframe for cars a longitudinal metal sill having the height thereof between the bolsters, and between the bolsters and its end greater than at the point where it passes over said bolster.

15. In an underframe for cars the combination with the center sills and the side sills, of transverse braces consisting of two metal bars one of which has its ends secured to the upper edges of said side sills and at suitable points between its ends to the under edges of said center sills, and the other of which has its ends secured to the lower edges of said side sills and at points intermediate its ends to the upper edge of said center sill.

16. In an underframe for cars the combination with one or more center sills, and side sills of transverse braces consists of two metal bars one of which is connected to the upper edges of the side sills and the lower edges of the side sills, and the lower edges of the center sill, and the other to the lower edges of the side sills and the upper edge of the center sill, and are secured together at points between said center sill and side sill where they cross each other.

17. In an underframe for cars the combination with the center sills and the side sills, of transverse braces connecting and arranged in inclined planes between said center sills and side sills and having their ends extended beyond the edges of said side sills and secured to the vertical webs thereof.

18. In an underframe for cars a sill consisting of a single flanged beam the distance between the flanges of which where it passes over the body-bolsters is less than at other points along its length.

19. In an underframe for cars the combination with the center and side sills, transverse braces consisting of metal bars which are respectively connected to the upper edge of a side sill and the lower edge of a center sill, and to the lower edge of a side sill and the upper edge of a center sill.

WILLIAM P. BETTENDORF.

Witnesses:
MARCIA FRIEL,
FRANK D. THOMASON.